March 18, 1930.                G. J. LIESER ET AL                1,750,809
BASTER FOR MEATS
Filed April 22, 1929
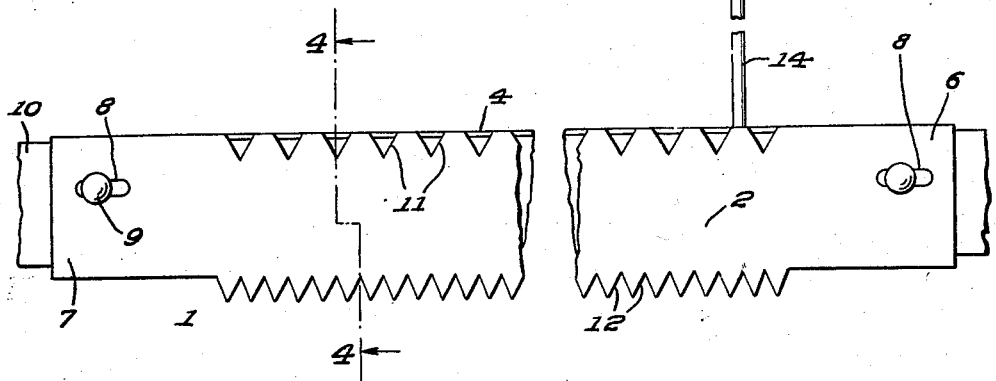
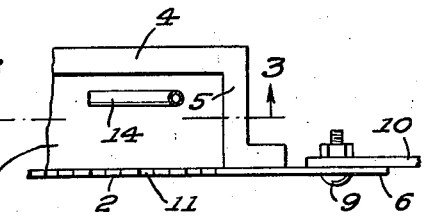
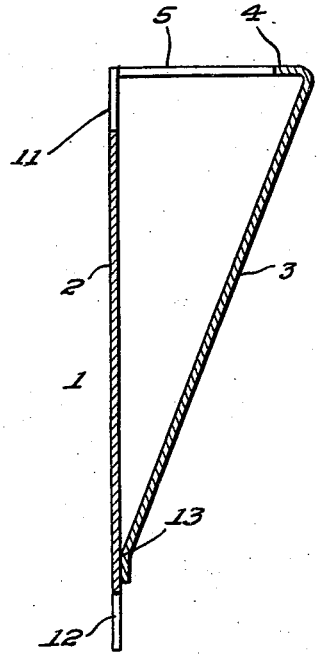
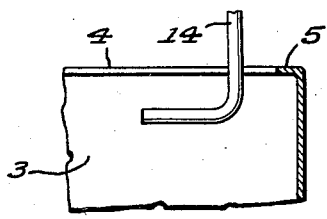
INVENTORS:
G. J. Lieser and
P. C. Murphy
ATTORNEY Patented Mar. 18, 1930

1,750,809

UNITED STATES PATENT OFFICE

GEORGE JOSEPH LIESER AND PATRICK C. MURPHY, OF CHICAGO, ILLINOIS

BASTER FOR MEATS

Application filed April 22, 1929. Serial No. 357,165.

This invention relates to improvements in basters for meats and more particularly to a device adapted for use in connection with barbecue machines, roasting, baking or cooking devices for basting meats while they are cooking to insure their tenderness when done. A further object is to provide a device of this class that is simple in construction, inexpensive to manufacture and positive and efficient in use.

With the foregoing and other objects in view the invention consists in the combination and arrangement of parts to be hereinafter fully described, pointed out in the claims and illustrated in the accompanying drawing which forms a part of this application for patent and in which—

Fig. 1 is a fragmentary view of the baster in front elevation.

Fig. 2 is a fragmentary plan view of Fig. 1.

Fig. 3 is a longitudinal sectional view through Fig. 2 on the line 3—3.

Fig. 4 is a cross sectional view, enlarged, on the line 4—4 of Fig. 1.

Like reference characters denote corresponding parts throughout the several views.

In restaurants, road houses, eating houses along the roadside, sandwich stands and elsewhere where foods are served barbecued meats have acquired great popularity but frequently the food, due to the lack of proper care or attention, while cooking, is tough and so not as satisfying or gratifying to the taste as might be.

The present invention is designed primarily to make possible the tender cooking of such foods automatically or without particular attention on the part of the cook or attendant. Frequently in rushed periods the attendants have not the time to give to the cooking of the foods served that is otherwise possible.

The invention comprises a service vat or container for the gravy or basting fluid, the vat being kept constantly full from a supply source and being formed with a feed or drain edge over which the contents flow or seep to a distributer edge from which the overflow is directed upon the cooking meat in sufficient volume only to insure cooking without dryness, which results in tenderness of the product when ready to serve.

The reference numeral 1 denotes the service vat which is elongated or trough shaped, approximately triangular in cross section, preferably, and tapers or converges from its upper or open portion to its closed or lower portion. The cross sectional appearance of the vat in its preferred form is substantially that of an inverted right angled triangle as shown in Fig. 4, the leg of the inverted triangle forming the perpendicular side or front face 2 of the vat, the hypotenuse forming the rear face 3 and the inverted base forming the top 4 which is open or cut away except for a flange-like portion that merges into the face 3. Each end 5 of the vat is closed and is triangular in shape connecting the faces 2, 3 and the top 4.

The face 2 is extended beyond the ends 5 to form the flanges 6, 7 each of which is formed with an elongated slot 8 through which the bolt 9 extends that adjustably secures it to a supporting link 10. The upper edge of the face 2 is formed with the large serrations 11 and the lower edge of said face extends below the lower edge of the face 3 and is formed with the relatively small or fine serrations 12. The teeth or serrations of the lower edge of the face 2 are approximately twice the number, or one-half the size, of the serrations 11. The faces 2, 3 are brazed together at 13.

A pipe 14, curved at its lower end, extends from the supply tank 15, disposed upon support 16, into the vat and keeps it filled with the basting fluid, the flow of which fluid is regulated by the valve 17 in said pipe. After the vat has been filled from the tank 15 the valve 17 is so adjusted that a predetermined quantity of basting fluid is admitted steadily to the vat, just enough to keep the vat overflowing or seeping through the serrated overflow edge 11, the fluid running over the face 2 and being approximately evenly distributed over the distributor edge 12 from which it drips upon the roasting meat, provided only that the serrated edge 11 is horizontal.

What is claimed is:—

1. In a baster for meats, a vat open at its top, one of the sides of said vat being formed with two serrated edges, and a supply pipe for said vat.

2. In a baster for meats, a vat, one of the sides of said vat comprising an overflow and a distributor edge, and a supply pipe for said vat.

3. In a baster for meats, a vat, one of the sides of said vat comprising a serrated upper and a serrated lower edge, the serrations of the lower edge being substantially twice those of the upper edge in number, and a supply pipe for said vat.

4. In a baster for meats, a vat formed with a flanged top portion, one of the sides of said vat being formed with two serrated edges, and a supply pipe for said vat.

5. In a baster for meats, a vat open at its top, one side of said vat being perpendicular, teeth formed in the upper and lower edges of said perpendicular side, and a supply pipe for said vat.

6. In a baster for meats, a container comprising front and rear faces and an open top, one of said faces being perpendicular and serrated along its upper edge to permit the overflow of the contents of the container, distributor teeth formed along the lower edge of said face, and a supply pipe for said container.

7. In a baster for meats, a container comprising front and rear faces and an open top, one of said faces being perpendicular and serrated along its upper edge to permit the overflow of the contents of the container, said front and rear edges being brazed together along one edge, teeth formed in said perpendicular edge below its junction with said rear edge, and supply means for said container.

In testimony that we claim the foregoing as our own we have hereto affixed our signatures.

GEORGE J. LIESER.
PATRICK C. MURPHY.